(12) United States Patent
Nicholson et al.

(10) Patent No.: US 11,256,926 B2
(45) Date of Patent: Feb. 22, 2022

(54) METHOD AND SYSTEM FOR ANALYZING THE MOVEMENT OF BODIES IN A TRAFFIC SYSTEM

(71) Applicant: VIVACITY LABS LIMITED, London (GB)

(72) Inventors: Mark Nicholson, London (GB); Yang Lu, London (GB)

(73) Assignee: VIVACITY LABS LIMITED

( * ) Notice: Subject to any disclaimer, the term of this patent is extended or adjusted under 35 U.S.C. 154(b) by 461 days.

(21) Appl. No.: 16/330,649

(22) PCT Filed: Aug. 15, 2017

(86) PCT No.: PCT/IB2017/054962
§ 371 (c)(1),
(2) Date: Mar. 5, 2019

(87) PCT Pub. No.: WO2018/051200
PCT Pub. Date: Mar. 22, 2018

(65) Prior Publication Data
US 2021/0279476 A1   Sep. 9, 2021

(30) Foreign Application Priority Data
Sep. 15, 2016  (GB) ..................... 1615717

(51) Int. Cl.
*G06K 9/00* (2006.01)
*G06T 7/70* (2017.01)
(Continued)

(52) U.S. Cl.
CPC ..... *G06K 9/00785* (2013.01); *G06K 9/00986* (2013.01); *G06K 9/6217* (2013.01);
(Continued)

(58) Field of Classification Search
CPC .......... G06K 9/00785; G06K 9/00986; G06K 9/6217; G06K 9/6271; G06K 2209/23;
(Continued)

(56) References Cited

U.S. PATENT DOCUMENTS 5,761,326 A * 6/1998 Brady ...................... G08G 1/04
382/103
8,825,350 B1 * 9/2014 Robinson ............... G08G 1/042
701/117

(Continued)

FOREIGN PATENT DOCUMENTS

WO     WO9516252 A1    6/1995

OTHER PUBLICATIONS

International Search Report and Written Opinion dated Dec. 11, 2017.

*Primary Examiner* — Dakshesh D Parikh
(74) *Attorney, Agent, or Firm* — Fresh IP PLC; Clifford D. Hyra; Aubrey Y. Chen (57) ABSTRACT

A method and system for real-time monitoring traffic in a predetermined location; the system comprising: an image capture unit arranged for capturing a pixel image of traffic in the predetermined location; a processor arranged for: identifying and classifying the or each object within the image via a neural network process using the pixel data to generate an object type; determining a location co-ordinate for the or each object type; linking the or each object with corresponding objects in subsequent or preceding frames; creating an array of object type and location co-ordinates over time; a communications unit arranged for communicating the array of object type and location co-ordinates with an end user; and a feedback unit arranged for producing a representation
(Continued)

of the object type and location co-ordinates to enable the end user in use, to determine information relating to the traffic in the predetermined location.

18 Claims, 6 Drawing Sheets

(51) Int. Cl.
    *G06K 9/62*     (2006.01)
    *G06T 7/20*     (2017.01)
    *G08G 1/0962*     (2006.01)
    *H04N 7/18*     (2006.01)

(52) U.S. Cl.
    CPC .............. *G06K 9/6271* (2013.01); *G06T 7/20* (2013.01); *G06T 7/70* (2017.01); *G08G 1/0962* (2013.01); *H04N 7/183* (2013.01); *G06K 2209/23* (2013.01); *G06T 2207/10016* (2013.01); *G06T 2207/20084* (2013.01); *G06T 2207/30236* (2013.01)

(58) Field of Classification Search
    CPC ... G06T 7/70; G06T 7/20; G06T 2207/10016; G06T 2207/20084; G06T 2207/30236; G08G 1/0962; H04N 7/183
    USPC .......................................................... 348/149
    See application file for complete search history.

(56) References Cited

U.S. PATENT DOCUMENTS

| | | |
|---|---|---|
| 9,418,546 B1 | 8/2016 | Whiting et al. |
| 2002/0054210 A1* | 5/2002 | Glier ...................... H04N 7/183 348/149 |
| 2005/0134478 A1* | 6/2005 | Mese ............... G08G 1/096716 340/901 |
| 2009/0195653 A1* | 8/2009 | Miao ........................ G08G 1/04 348/149 |
| 2010/0076915 A1* | 3/2010 | Xu ........................... G06N 3/084 706/25 |
| 2016/0210512 A1* | 7/2016 | Madden ............. G06K 9/00771 |
| 2016/0307071 A1* | 10/2016 | Perronnin ................. G06K 9/66 |
| 2017/0154314 A1* | 6/2017 | Mones ................ G06F 16/2462 |
| 2018/0115751 A1* | 4/2018 | Noone ................. H05B 47/125 |

* cited by examiner

METHOD AND SYSTEM FOR ANALYZING THE MOVEMENT OF BODIES IN A TRAFFIC SYSTEM

This application claims the benefit of Great Britain Patent Application No. 1615717.4, filed Sep. 15, 2016, which is hereby incorporated by reference in its entirety.

The present invention relates to a method and system for analyzing the movement of bodies in a traffic system, particularly, but not exclusively to a system and method using video imaging and deep learning algorithms.

Traffic in many countries is getting ever worse. London is the most congested city in Europe, with drivers typically spending over 100 hours a year stuck in congestion, this is equivalent to 2.5 working weeks. The estimated annual cost to the UK economy of congestion is over £20 bn. Improving the operation of traffic networks is key to unlocking future growth and with governments suggesting that they will be investing heavily in future infrastructure, this is a good time to be tackling this problem.

In recent years there have been many systems proposed to monitor traffic and analyze the movement thereof. These systems often include video systems and video analysis methodologies.

Traffic monitoring and analysis systems can be attached to lampposts and other "street furniture". Typical systems may include a street lighting intelligent monitoring device, attached to a lamppost and includes a video camera for taking real time images of the traffic flow in the vicinity. A video analysis system may then be used to monitor the traffic and identify specific types of traffic to make determinations about the traffic and the traffic flow.

A common problem at present is the ability of drivers of vehicles to see more vulnerable traffic such as cyclists and pedestrians. This group of traffic is much more vulnerable to accidents as they are small and difficult to see and identify with traditional traffic monitoring systems. Even as more intelligent systems come in to play (e.g. connected vehicles which are always advertising/broadcasting their presence), this will still be a problem—pedestrians and cyclists will still be digitally invisible.

It is worthy of note that there are existing capabilities which can identify cyclists in segregated cycle lanes. However, identification in a mixed mode traffic environment is extremely challenging with existing capabilities.

An intelligent camera platform for monitoring flows of pedestrians and vehicles around spaces has been proposed. This platform can be used to understand the movement of pedestrians in shopping centres or rail environments; parking space occupancy by bicycles or cars; and any traffic on roads. The known systems work but to date have failed to provide sufficient information to enable the tracking and monitoring of more vulnerable traffic.

An object of the present invention is to provide a method and system for better identifying vulnerable traffic and subsequently to ensure that their presence is known by the system and/or other vehicles in the vicinity. This information could then be used to send data to larger vehicles or monitoring systems and help to prevent accidents and other traffic problems.

A further object of the present invention is to overcome at least some of the problems associated with current day processes and systems for monitoring traffic in general in or streets.

According to one aspect of the present invention there is provided a system for real-time monitoring traffic in a predetermined location; the system comprising: an image capture unit arranged for capturing a pixel image of traffic in the predetermined location; a processor arranged for: identifying and classifying the or each object within the image via a neural network process using the pixel data to generate an object type; determining a location co-ordinate for the or each object type; linking the or each object with corresponding objects in subsequent or preceding frames; creating an array of object type and location co-ordinates over time; a communications unit arranged for communicating the array of object type and location co-ordinates with an end user; and a feedback unit arranged for producing a representation of the object type and location co-ordinates to enable the end user in use, to determine information relating to the traffic in the predetermined location.

According to a second aspect of the present invention there is provided a method of monitoring traffic in a predetermined location; the system comprising: capturing a pixel image of traffic in the predetermined location; identifying and classifying the or each object within the image via a neural network process using the pixel data to generate an object type; determining a location co-ordinate for the or each object type; linking the or each object with corresponding objects in subsequent or preceding frames; creating an array of object type and location co-ordinates over time; communicating the array of object type and location co-ordinates with an end user; and producing a representation of the object type and location co-ordinates to enable the end user, in use, to determine information relating to the traffic in the predetermined location.

Advantageously, various embodiments are provided by features as defined in the dependent claims.

The present invention will now be described, by way of example, to the accompanying drawings in which.

In broad terms, the present invention relates to an intelligent camera technology system appropriate for monitoring traffic flows and determining how busy the roads are. The system may assess flows of vehicles in and out of a specific location, to build a real-time understanding of traffic movement and types of traffic present. This enables monitoring traffic at key locations to provide a large scale real-time traffic information system. The present invention identifies a key hardware platform to monitor road traffic in real time; and the appropriate algorithms to give a representation for journeys and general traffic movement.

Figure 1:
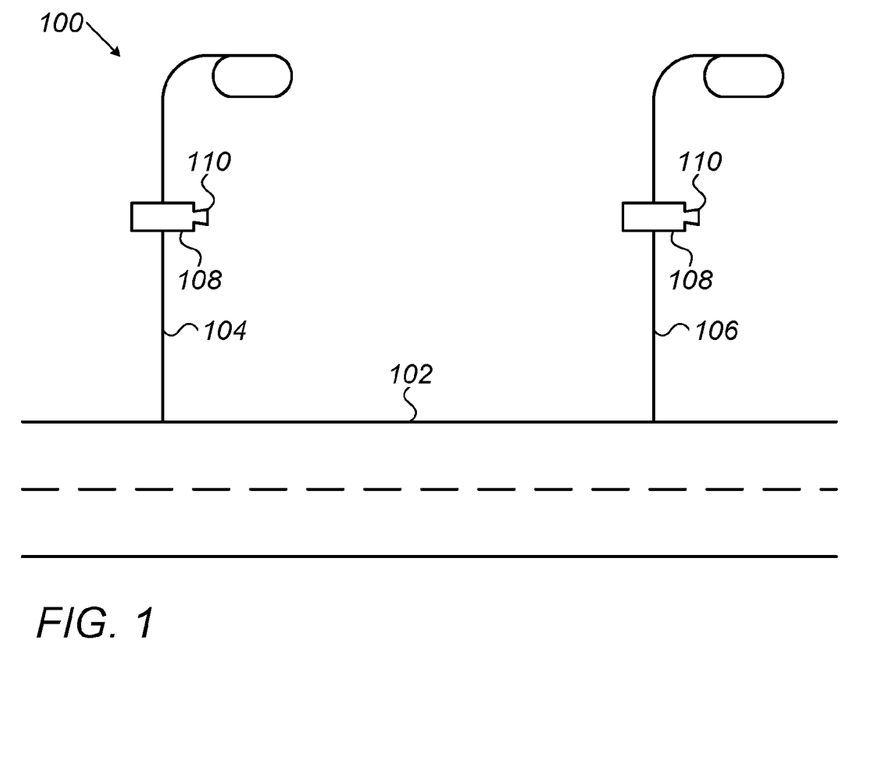
FIG. 1 is the simplified diagram of the system, according to an aspect of the present invention.

Referring to FIG. 1 a system 100 is shown. A road 102 has a number of street lights 104, 106. The street lights each carry a traffic monitoring system 108 including a camera or image capture unit 110. Ideally the camera is a video camera which can capture traffic movement in the vicinity in real time.

Figure 2:
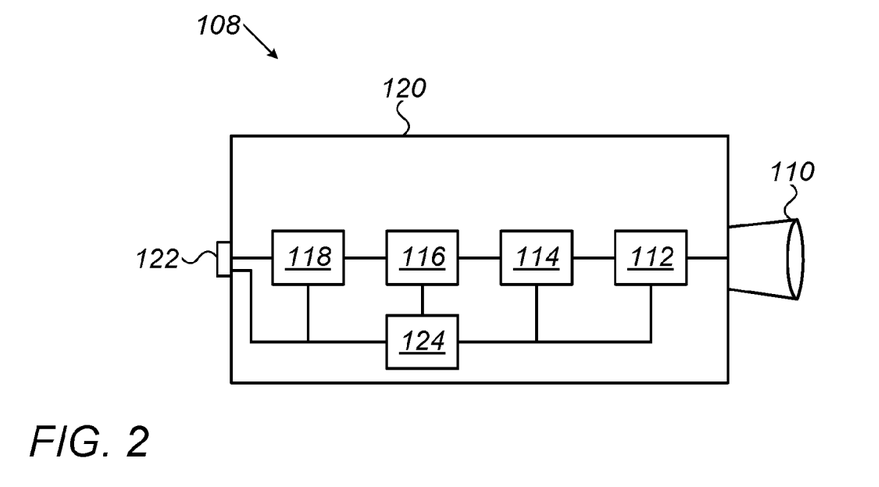
FIG. 2 is the simplified diagram of a sensor system, according to an aspect of the present invention.

FIG. 2 shows a block diagram of the traffic monitoring system 108 and the camera 110. Each traffic monitoring system 108 may include a camera 110, a video image processing unit 112, a processor 114, a memory 116, a communications unit 118, an enclosure 120, a transmitter 122 and a battery or other power source 124.

The camera may be a wide-angle fish-eye camera, to reduce the number of sensors required to cover a specific space. Camera resolution will be chosen according the field of view of the individual system and the detail required to resolve accurately queue lengths and journey times. The video processing unit may be of any appropriate type and be capable of converting the images into pixel data. The processor may be either a Tegra X1 or any other appropriate processor. The communications unit may be based on Wi-Fi, GSM or any other appropriate technology. The enclosure may be waterproof or otherwise sealed and protected to ensure that the sensor cannot be damaged whilst in situ. The transmitter may also be waterproof and be appropriate to the communications protocol chosen for the communications unit. The battery will be sufficient to power the device for a predetermined period. In an alternative embodiment, a solar panel (not shown) may be used to recharge the battery and thereby extend the use time. In a still further embodiment, the system may be powered by the power source on the lamppost or a combination of this and a battery, since the lamppost may only be powered during night-time hours.

Figure 3:
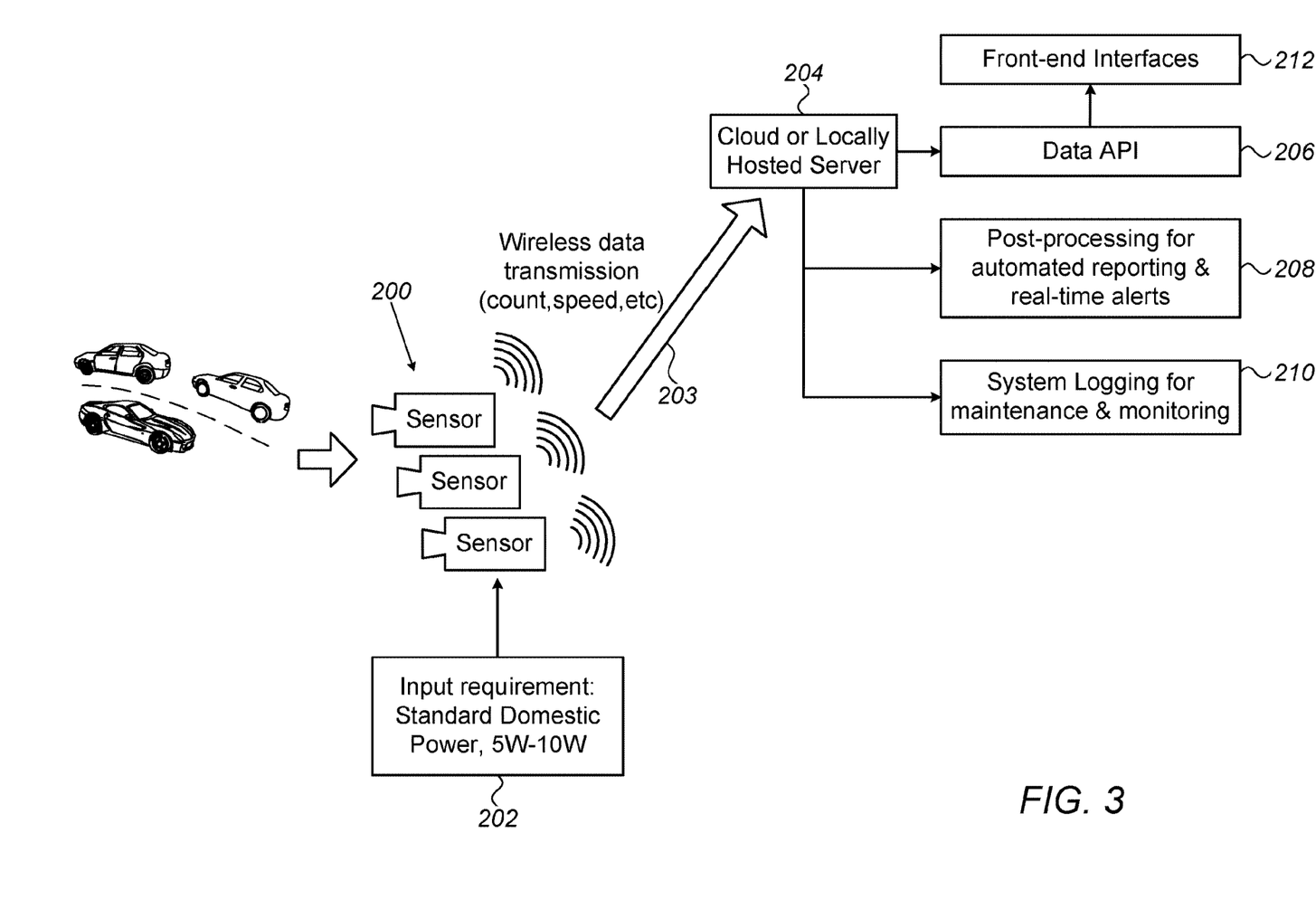
FIG. 3 is the block diagram of a road traffic monitoring system, according to an aspect of the present invention.
Figure 4:
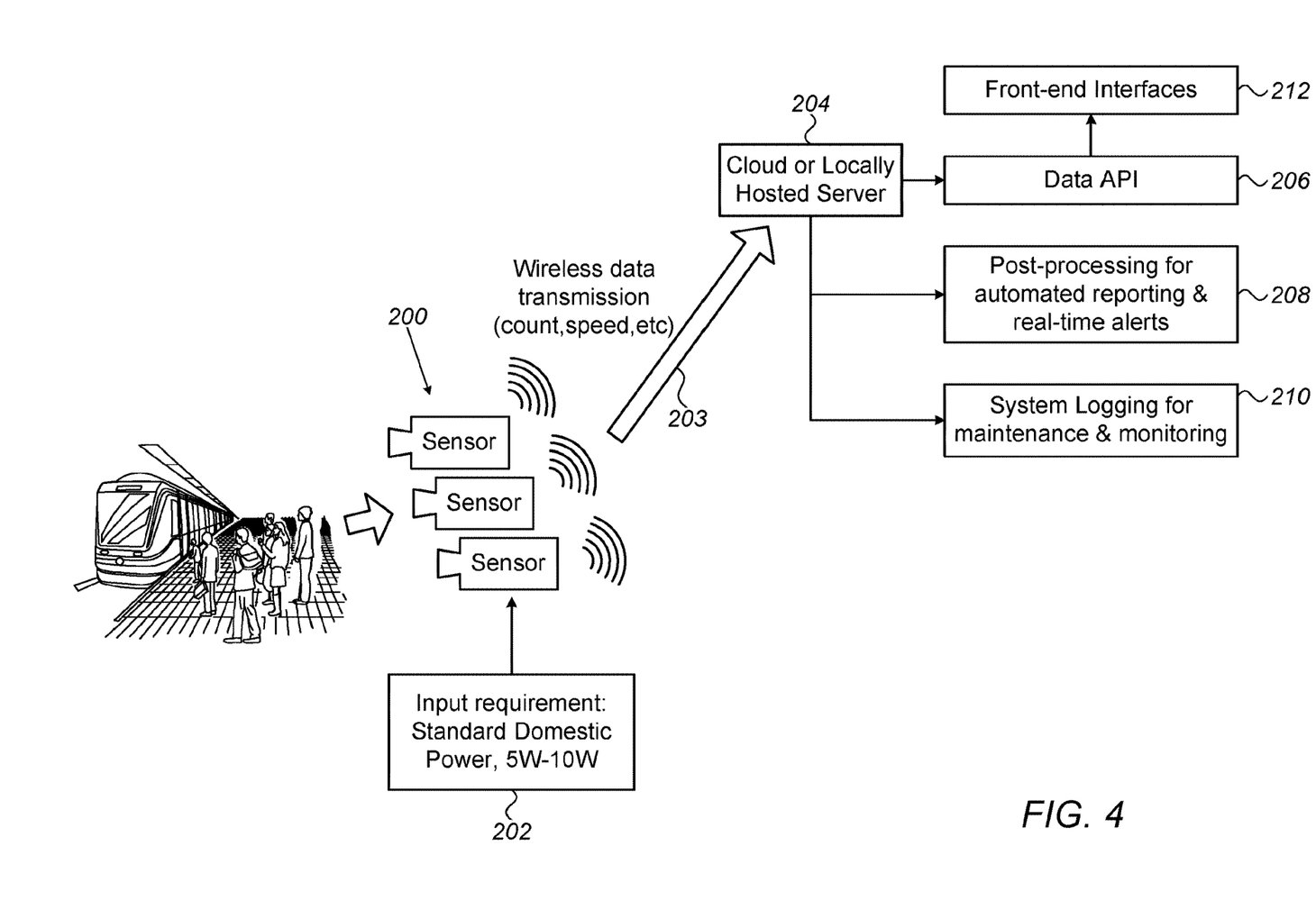
FIG. 4 is a block diagram of a station monitoring system, according to an embodiment of the present invention.
Figure 5:
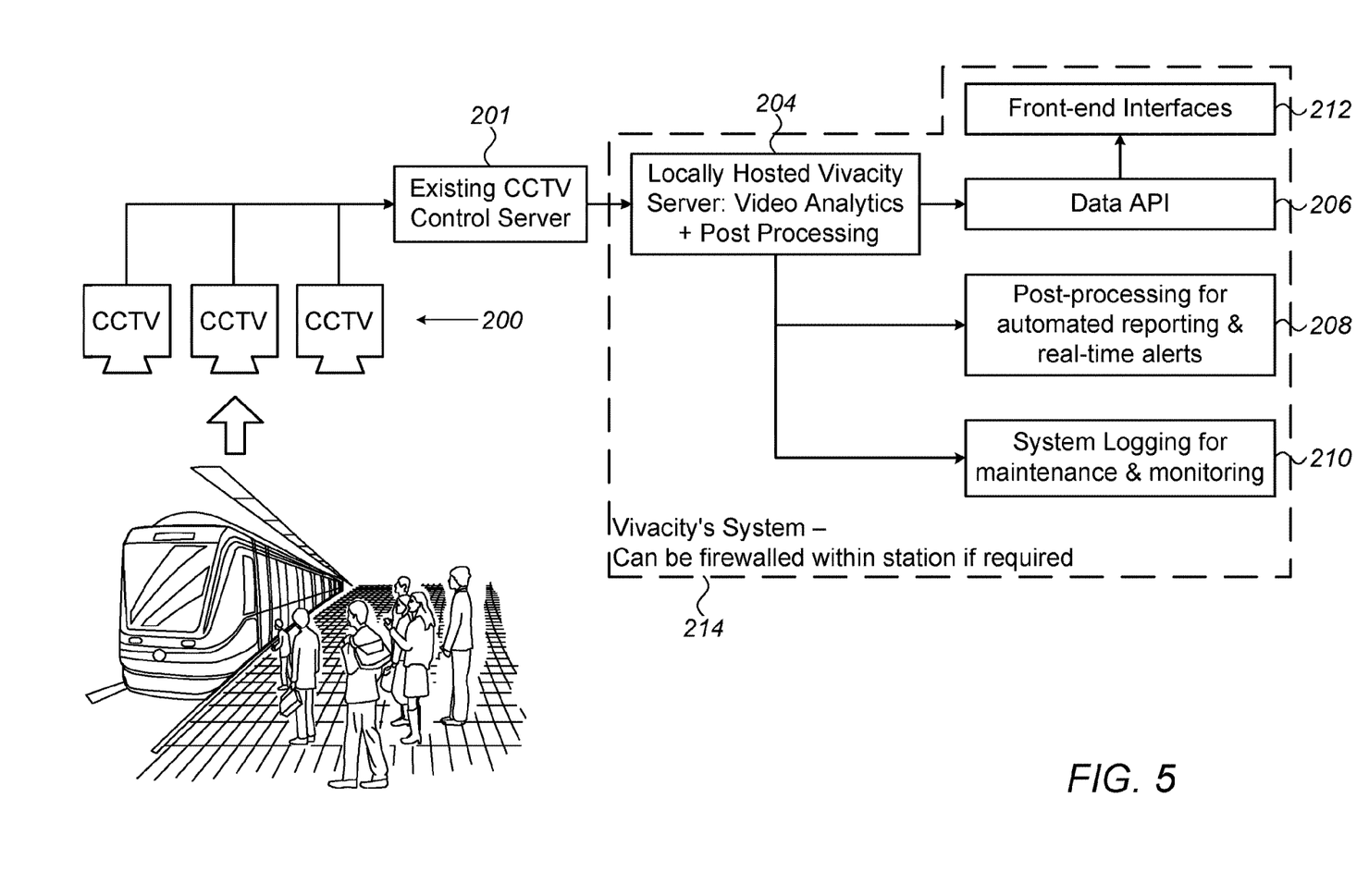
FIG. 5 is a block diagram of a station monitoring CCTV option, according to an embodiment of the present invention.

FIGS. 3, 4 and 5 show the system details in terms of functionality for road and station systems. Like reference numbers relate to like functionality units for each type of set up. It may be also possible to monitor other environments, for example, shopping centers, airports, or any other place with traffic, be it human or vehicles. One or more sensors 200 or traffic monitoring systems are deployed in predetermined locations to monitor traffic therein. As previously mentioned the sensors 200 are provided with power 202. Data is processed within the sensors as will be described in detail below. For the road set up, the traffic may include vehicles and pedestrians. In the station set up the traffic may comprise pedestrians only. After processing the data, wireless data 203 relating to traffic is transmitted via a cloud or locally hosted server 204. The data may be sent to local vehicle or a central monitoring system (not shown). At the central monitoring system various types of post processing may occur. This includes data API 206; post-processing for automated reporting and real-time alerts 208, and system logging for maintenance and monitoring 210. The results of the post processing may be communicated with a front end interface 212.

The data API (automatic programming interface) may provide real-time data in computer format to software which needs it. For example, the goal may be to provide data through the API to an application which gives real-time traffic and car parking data. The API could also give real-time traffic data to feed in to transport models.

Referring to FIG. 5, a station system based on a CCTV option is shown. This includes CCTV cameras or sensors 200 linked to an already existing CCTV server 201 which connects to a locally hosted server 204. Other aspects of this embodiment are similar to those in FIGS. 3 and 4. A firewall 214 may be employed in this or any other set up or system as required.

The data processing will now be described in further detail. The present invention allows classification of vehicles to be much more accurate than alternative techniques. The present invention can, crucially, differentiate cyclists from motorcyclists. Many current sensors simply act as presence detectors and cannot do this. In addition, the present invention enables an accurate count of each type of vehicle to be determined.

The present invention includes an intelligent camera which uses video analytics to understand the movement of bodies in transport systems in its field of view. The camera image is processed using deep learning algorithms (neural networks) running on a graphics processing unit (GPU) in order to understand the exact positions of the objects.

In one embodiment, the processor uses a neural network based on the Caffe framework. The Caffe framework is an example of an appropriate framework, however the present invention is not limited to this and other frameworks may be used in alternative embodiments. To generate outputs, information from multiple pixels is combined and simplified over a number of layers, gradually drawing out higher level insights about the image, starting at identifying simple features in the base image such as gradients or contours, moving on to identifying mid-level features such as wheels, signs or windscreens, and eventually generating a top-level understanding of the scene (e.g. "I can see 10 cars and a cyclist").

In an embodiment of the present invention an important part of the process is the use of convolutional filters, which can act as part of a higher layer of the neural network described above. Mathematical convolution operations (or filters) may be used to assess one or more areas of a lower layer in turn for particular features. Each convolutional operation is tuned to one or several of these features, and scans across the layer looking for that feature. These features may identify gradients, edges or lines in lower layers; object components such as wheels, number plates, or windscreens in medium layers; or full vehicles in higher layers. These convolutional filters generate activation or feature maps, showing how strongly a convolutional filter was activated by a particular region of the lower layer, and acting as inputs into the next layer in the network. The sequential convolutional process allows the network to pick up features of increasing size, ultimately identifying full vehicles. Each time the convolution filters are used a more detailed representation of the features of an object is built up through identifying a higher-order set of features with each pass. For example, a lower convolutional layer may identify several circular gradient patterns of different colours, which is later identified in a higher layer as a wheel and tyre. In this way, a sequential understanding of the key objects in the image is constructed.

The parameters that define the convolutional filters are generated through iterative training processes, whereby thousands of pre-labelled images are passed through the network, and the parameters adjusted through back-propagation algorithms which make small changes to the values of those parameters to optimise the output on a particular batch of images, before moving on to the next batch.

When processed at several frames per second (typically >4 Hz) this gives real-time data about the classified count of vehicles that have moved through the field of view; provides data about the speed and acceleration of any vehicle; and about the behaviour of different vehicles e.g. movement of cyclists into another vehicles' blind spots etc.

After the neural network has generated a detailed set of labels of the location and type of objects in the frame, several post-processing steps are performed. These convert the initial labels into usable data, which is appropriate for consumption by end-users. End users may be people or machines. The first step is to generate tracked objects from the labels. This requires a combination of several sequential frames from the video, to observe the movements of groups of pixels identified as objects by the neural network, and then group these together to identify single objects moving through time, using the original labels and the raw image data. These objects are tracked through the video, and paths for each object are generated. These paths are used to give classified counts, behaviour, and speed of the objects.

In another iteration of the software, a recurrent neural network architecture is used to perform the tracking process, by adding a memory to the network in order to link sequential images together, enabling tracking to also be performed within the neural network. The linkage of the sequential images may be carried out such that the or each object is linked with corresponding objects in subsequent or preceding frames. This helps to identify objects and gives a more accurate representation of the array of object type and location co-ordinates which are generated over time.

Figure 6:
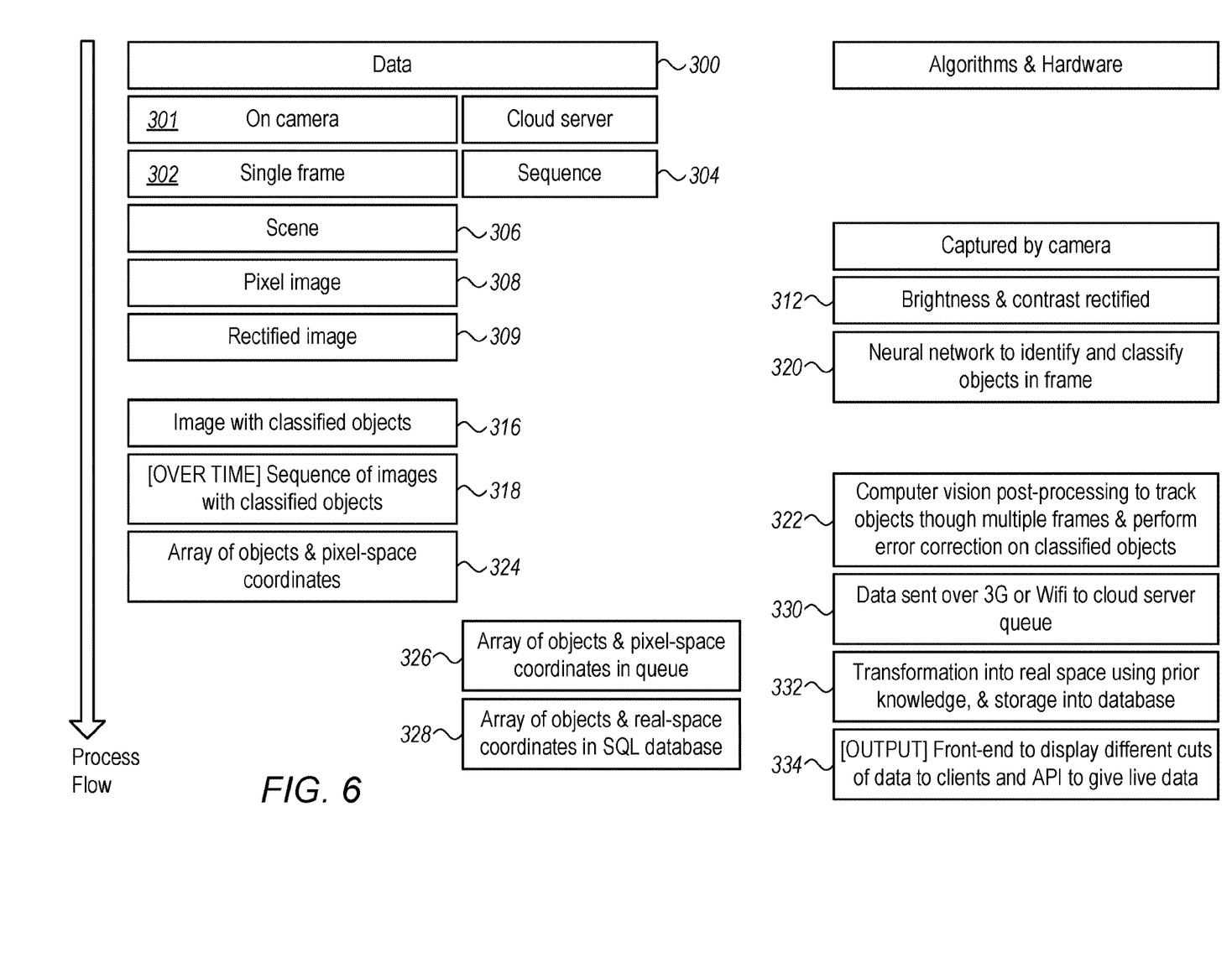
FIG. 6 is a flow diagram of a method for operating a traffic monitoring system, according to an embodiment of the present invention.

Referring to FIG. 6, the processing steps will be described in greater detail. The left hand side of the diagram includes details of the data processed, and the right hand side gives an indication of the algorithms and hardware used for the data processing steps.

Data 300 is captured on the camera 301 and is captured on the basis of a series of single frames 302 which together comprise a sequence 304. The camera data is used to generate a detailed pixel image 308 of each scene. The image is rectified 309 by process 312 and then the pixel image may be classified via a neural network.

A library of still images is used to create a machine learning model. The model is fundamentally an advanced statistical compression of the original still images, and turns the still image set (several gigabytes in size) into a streamlined function (tens to hundreds of megabytes in size), where the images were used to inform what the function looks like and does, but where the function is only a series of mathematical instructions which turn a new image into a set of labels. The system is trained by giving it many thousands of images and the corresponding labels; the model/function is derived over multiple iterations by comparing the output labels given by the function to the known labels, and adjusting the function appropriately for the next iteration, until the model converges. For example a region within the image may be identified within the model as part of a headlight rim for a car. A different region may be labelled as a lorry headlight rim. These would help the model to probabilistically identify the most likely identity of that particular object.

Once the objects in the image have been identified and classified by the neural network an image 316 can be created containing the classified objects, e.g. a car, a bicycle or a person. Over time a sequence of images which contain classified objects is built-up 318. Computer vision postprocessing 322 may be used to track objects through multiple frames and to perform error correction on classified objects. Objects which are classified differently in subsequent frames can be identified, and the correct classification can be taken from the most common classification or the classification when the object is closest to the camera.

The sequence of images with classified objects is then converted into an array of objects and location co-ordinates 324. These are then sent to the cloud server in a coordinated queue 326 and stored in an appropriate database 328 as objects and real space or location co-ordinates. The data may be sent via 3G or Wi-Fi 330. The transformation into real space or location co-ordinates may use prior knowledge 332 before a final version is stored in the database. The data can then be displayed to different front-ends 334 to display different parts of data to clients and API to give live data information on the traffic.

Data is provided at pixel-level from the camera, which is downscaled to a high-level understanding of a still image by the neural network, generating object-level data. Subsequently, this high-level understanding by the neural network is further downscaled by combination with subsequent frames to generate an object-level understanding of sequential object movements through observing sequential still images (i.e. video) by the computer vision algorithms. The object-level understanding is sent to the API and shared more broadly.

The images may be presented or represented, by a feedback unit (not shown), to users and may be converted into any appropriate form. For example a camera view of the back of a bus from the sensor on a lamppost is shown to the driver, via a display, to indicate when cyclists are in the vicinity. In an alternative embodiment, traffic statistics can be determined based on data sent to the central monitoring system. In a still further embodiment, there may be a warning signal in the form of an alarm which indicates the presence of a cyclist or pedestrian. As a result of the information given to the end user, action may be taken to change the traffic flow and make the passage of vehicle and/or people change to improve conditions. In a further embodiment, the system may provide data to traffic lights to make them more intelligent, automating changing traffic lights so that it is based on the objects present. As a result, a cyclist might be given priority over a lorry, or an ambulance over any other vehicle. In a system using a CCTV camera, the feedback unit may be a CCTV processing station.

The algorithms are sufficiently flexible to require minimal setup. On installing a unit, the sensor can be calibrated remotely by sending back a single image, selecting four points on the image and on the corresponding floorplan/map. The calibration technique will be described in greater detail below.

Using machine learning techniques, the sensors have a much better understanding of the scene than a naïve traditional sensor. The machine learning algorithms automatically understand perspective, foreground, background, different objects, and classifications of vehicles, eliminating the need for the vast majority of the configuration. The sensor configuration may be as simple as clicking on four points on the ground in the image (e.g. the locations of the sensors lampposts, or stop junctions) and clicking on the same four points on a map or floorplan. This calibrates the image so that the conversion between camera output and floorplan is complete. After this, the cameras can operate with typically no further configuration, automatically gathering their sensor IDs from the server, classifying objects in their field of view without manual calibration, identifying their positions, and sending this data back to the server.

The sensor unit is permanently connected to the internet, and can have remote upgrades and updates to its sensors, as well as sending logs and actual data back to the central monitoring system.

Figure 7:
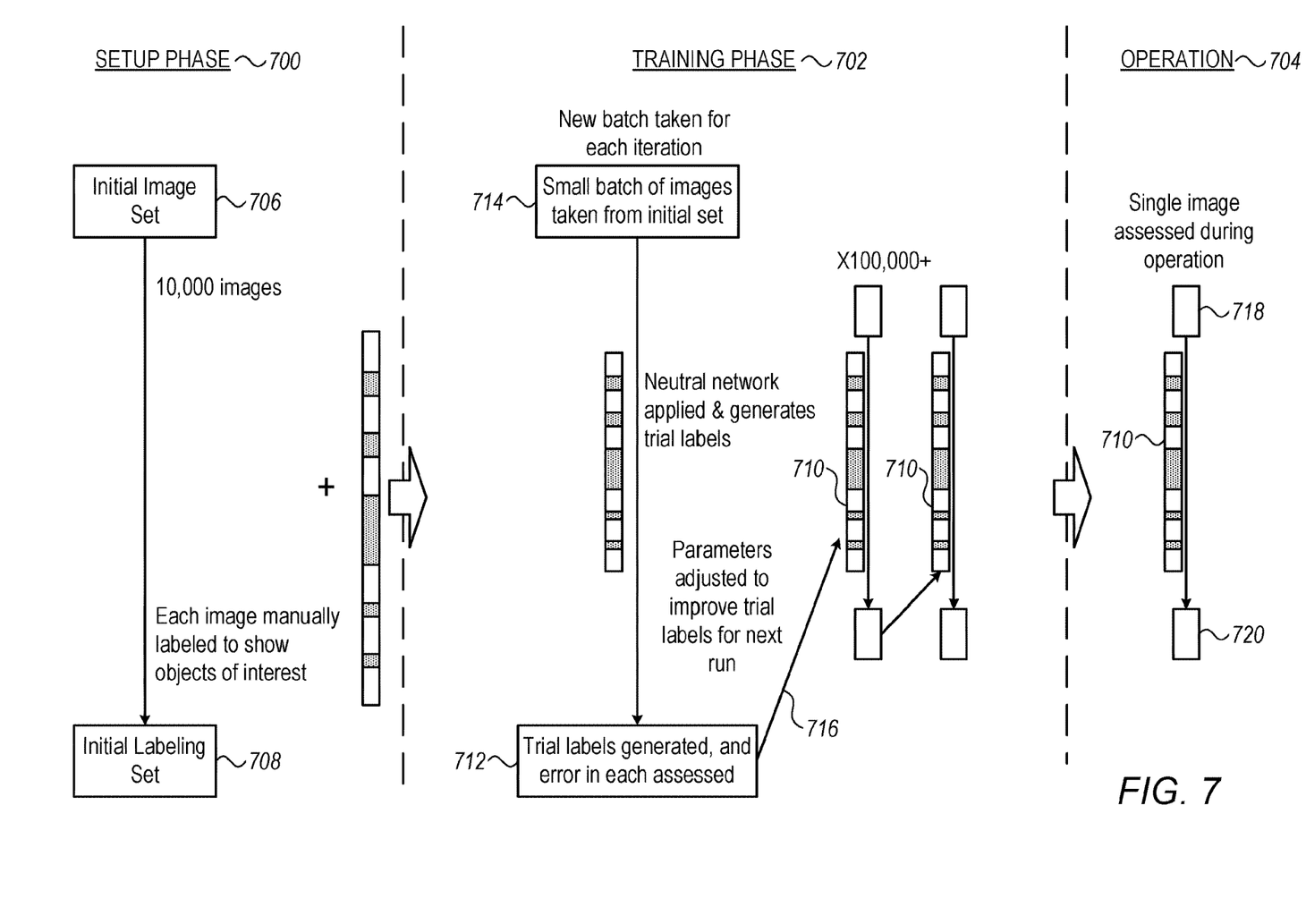
FIG. 7 is a diagram showing an example of the neural network processing, according to an embodiment of the present invention.

Referring now to FIG. 7, the processes of the neural network will be described in greater detail. Essentially, the neural network operates in three main manners. There is a setup phase 700, a training phase 702 and an operational phase 704.

The setup phase 700 takes many images from an initial image set 706 and converts these into an initial labelling set 708. There can be many thousands of images processed at this setup stage. The conversion can be done by manually labelling each image to identify objects of interest. Architecture defining the internal structure of the neural network 710, comprises a multiple layer structure defined by a very large number of parameters. The combination of the initial image set and the initial labelling set are inputs into the neural network in the setup phase.

In the training phase 702 a number of training iterations are carried out. In each training iteration, the neural network generates labels 712 for a small batch of images taken from the initial image set 714 using the current parameters 716 of the neural network as determined in the setup phase. The generated labels 712 are compared to actual labels 708, allowing calculation of the error at a network level. These errors are then differentiated to find the errors at an individual parameter level. This is then used to adjust the parameters to improve the network-level output on that batch of images. This process is repeated hundreds of thousands of times to optimise the parameters and to generate a functional and trained neural network. The process is also repeated for other image batches. The combination of inter and intra batch analysis results in a trained neural network which accurately recognises images and attributes an accurate label or classification thereto.

The number of training iterations that the neural network carries out will depend on the nature and type of the image and the training set and how quickly the various differentiations and adjustments are resolved. Once the neural network has been fully trained it can then be used to process individual images and determine a label for the object recognised by the neural network.

In the operational phase a single image 718 is input to the neural network and assessed thereby. The neural network comprises a multi-layer structure which represents the initial labelling set that has been tested and trained against batches of images 714. The layers allow assessment of the image to determine an accurate label output 720 for the particular image thus identifying an object type. The output label is very similar to the initial equivalent in the setup phase. As a result an object type can be identified by the above described process and used by the remainder of the system to generate the array of objects and location coordinates. Object type is not intended to be a restrictive term, but instead is intended to identify the nature of an object so that specific types of object can be identified and indicated to a user as elsewhere described. An example of an object type could be part of a bicycle, or merely a bicycle. The object type can be labelled in any manner that is appropriate and may depend to some extent on the labelling instigated at the setup phase 700.

The invention thus provides a new capability; for example, a sensor capable of detecting cyclists in mixed-mode traffic. This is achieved by combining machine learning techniques with sophisticated post-processing, all powered by the GPU, and with a remote asset monitoring and a data back haul capability. The data back haul capability allows the system to send the data back to the central monitoring system in real time. The connection to the mobile data networks ensures access to the data. The use of Artificial Intelligence, with leading microprocessors, with Internet of Things concepts, and big data processing techniques have enabled this novel approach.

The invention can help future connected vehicles to understand the rest of the traffic network. The invention can also help connected and autonomous vehicles to "look around the corner"; to understand what is in the blind spot behind a bus; or anticipate traffic further away on the route.

In addition to the features mentioned above, the system may be used to predict and plan for traffic movement at predetermined times of the day. The fact that the present invention provides real time real information of traffic in a specific location also opens up a plurality of further future applications and analysis which will be appreciated by the person skilled in the art.

It will be appreciated that the system and method has been described with reference to a number of different embodiments. These embodiments are not intended to be limitative and many variations are possible which will still fall within the scope of the present invention. The invention may be implemented in software, hardware or any combination thereof. Elements that are now illustrated as software can be changed to equivalent hardware elements and vice versa.

The invention claimed is:

1. A system for real-time monitoring traffic in a predetermined location; the system comprising:
   an image capture unit arranged for capturing a pixel image of traffic in the predetermined location;
   a processor arranged for:
   identifying and classifying the or each object within the image via a neural network process using the pixel data to generate an object type;
   determining a location co-ordinate for the or each object type;
   linking the or each object with corresponding objects in subsequent or preceding frames;
   creating an array of object type and location co-ordinates over time;
   a communications unit arranged for communicating the array of object type and location co-ordinates with an end user; and
   a feedback unit arranged for producing a representation of the object type and location co-ordinates to enable the end user, in use, to determine information relating to the traffic in the predetermined location,
   wherein the identifying and classifying comprises:
   combining information from multiple pixels in the pixel image,
   simplifying the information over a plurality of layers by first identifying simple features in the pixel image, the simple features comprising gradients, contours, edges, or lines, then identifying components of the or each object based on the simple features, and then generating the object type for the or each object based on the components,
   wherein the image capture unit and the processor are on the same device mounted on powered street furniture,
   wherein the object type is a cyclist within multimodal traffic, and
   wherein the processor uses a graphical processing unit or tensor processing unit in order to accelerate computation of the or each neural network.

2. A system according to claim 1, wherein individual pixels are classified by a neural network process and the classified pixels are grouped to form a classified object type.

3. A system according to claim 2, wherein the classified pixels are generated using a library of still images to create a machine learning model which is compared with each pixel to thereby classify the pixel.

4. A system according to claim 1, wherein the image capture unit is a video camera.

5. A system according to claim 1, wherein the feedback unit is a central processing unit.

6. A system according to claim 1, wherein the feedback unit is a display.

7. A system according to claim 6, wherein the display is located in a vehicle in the vicinity of the system.

8. A system according to claim 1, wherein the feedback unit is a CCTV processing station.

9. A system according to claim 1, wherein the link between the or each object in successive frames is made through a neural network process.

10. A system according to claim 9, wherein the neural network process linking objects between frames is the same neural network process as that identifying and classifying the or each object in each individual frame.

11. A method of monitoring traffic in a predetermined location; the method comprising:
- capturing a pixel image of traffic in the predetermined location;
- identifying and classifying the or each object within the image via a neural network process using the pixel data to generate an object type;
- determining a location co-ordinate for the or each object type;
- linking the or each object with corresponding objects in subsequent or preceding frames;
- creating an array of object type and location co-ordinates over time;
- communicating the array of object type and location co-ordinates with an end user;
- producing a representation of the object type and location co-ordinates to enable the end user, in use, to determine information relating to the traffic in the predetermined location;
- mounting a device for capturing the pixel image and processing the image on a lamp column or other powered street furniture; and
- accelerating computation of the neural network process using a graphical processing unit or tensor processing unit,
- wherein operation of the neural network process comprises:
- a setup phase in which a plurality of images from an initial image set are converted into an initial labeling set,
- a training phase in which the neural network generates labels for a batch of images taken from the initial image set, and in which the generated labels are compared to the initial labeling set to calculate error and to adjust parameters of the neural network, and
- an operational phase in which the pixel image is input to the neural network and assessed by the neural network, resulting in a label for the or each object in the pixel image, and
- wherein the object type is a cyclist within multimodal traffic.

12. A method according to claim 11, further comprising classifying individual pixels by a neural network process and grouping the classified pixels to form a classified object type.

13. A method according to claim 12, wherein the classified pixels are generated using a library of still images to create a machine learning model which is compared with each pixel to thereby classify the pixel.

14. A method according to claim 11, further comprising displaying the representation in the vicinity of the predetermined location.

15. A method according to claim 11, further comprising making the link between the or each object in successive frames through a neural network process, wherein the neural network process linking objects between frames is the same neural network process as that identifying and classifying the or each object in each individual frame, and wherein the method further comprises accelerating computation of the or each neural network using a graphical processing unit or tensor processing unit.

16. A system for real-time monitoring traffic in a predetermined location, the system comprising:
- an image capture unit for capturing a pixel image of traffic in the predetermined location;
- a processor arranged for:
- using a neural network to identify and classify at least one object in the pixel image by:
- combining information from multiple pixels in the pixel image,
- simplifying the information over a plurality of layers by identifying, in one or more lower layers in the plurality of layers, simple features in the pixel image, identifying, in one or more medium layers in the plurality of layers, components of the at least one object based on the simple features, and generating, in one or more higher layers in the plurality of layers, an object type for the at least one object based on the components,
- determining a location coordinate for the object type,
- linking the at least one object with corresponding objects in subsequent or preceding frames, and
- creating an array of object type and location coordinates over time;
- a communications unit for communicating the array of object type and location coordinates with an end user; and
- a feedback unit for producing a representation of the object type and location coordinates to enable the end user, in use, to determine information relating to the traffic in the predetermined location,
- wherein the image capture unit and the processor are on the same device mounted on powered street furniture,
- wherein the object type is a cyclist within multimodal traffic, and
- wherein the processor uses a graphical processing unit or tensor processing unit in order to accelerate computation of the or each neural network.

17. A system according to claim 16, wherein the using the neural network further comprises:
- utilizing convolutional filters to scan the one or more lower layers to find the simple features, to scan the one or more medium layers to find the components, and to scan the one or more higher layers to find the object type.

18. A system according to claim 17, wherein each of the convolutional filters generates one or more activation maps that display how strongly a given convolutional filter was activated, and wherein at least one of the one or more activation maps is used as an input to at least one of the plurality of layers.

* * * * *